United States Patent
Chen et al.

(10) Patent No.: US 12,431,798 B2
(45) Date of Patent: Sep. 30, 2025

(54) SWITCHING CONVERTER HAVING PULSE SKIPPING MODE AND CONTROL METHOD THEREOF

(71) Applicant: Richtek Technology Corporation, Hsinchu (TW)

(72) Inventors: Jung-Sheng Chen, Miaoli (TW); Chin-Chun Chuang, Taichung (TW); Che-Wei Chang, New Taipei (TW); Shi-Xian Wang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 223 days.

(21) Appl. No.: 18/495,775

(22) Filed: Oct. 27, 2023

(65) Prior Publication Data

US 2024/0243660 A1    Jul. 18, 2024

(30) Foreign Application Priority Data

Jan. 12, 2023   (TW) .................. 112101416

(51) Int. Cl.
*H02M 3/156* (2006.01)
*H02M 1/00* (2006.01)

(52) U.S. Cl.
CPC ......... *H02M 3/156* (2013.01); *H02M 1/0032* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081;
(Continued)

(56) References Cited

U.S. PATENT DOCUMENTS 8,253,407 B2 *   8/2012   Chen ................... H02M 3/1588
                                                  323/284
8,823,353 B2 *   9/2014   Zhang ............... H02M 3/33507
                                                  323/283
(Continued)

*Primary Examiner* — Jeffrey A Gblende
(74) *Attorney, Agent, or Firm* — Huan-Yi Lin

(57) ABSTRACT

A switching converter having pulse skipping mode includes a power stage circuit, a feedback control circuit, an operating signal generator circuit and a pulse skipping circuit. The feedback control circuit generates an initial pulse width modulation (PWM) signal according the output power. The operating signal generator circuit masks a part of pulses of a clock signal according to a pulse width of a pulse skipping signal, so as to generate an adjusted PWM signal. The pulse skipping circuit adaptively generates a duty ratio signal according to an input voltage and an output voltage, so as to generate the pulse skipping reference signal related to a duty ratio of the initial PWM signal. The pulse skipping circuit compares an amplification signal with the pulse skipping reference signal to generate the pulse skipping signal. The power stage circuit converts the input power to the output power according to the adjusted PWM signal.

20 Claims, 11 Drawing Sheets

(58) Field of Classification Search
CPC .......... H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| 8,880,969 | B2 * | 11/2014 | Xi | H02M 3/156 |
| | | | | 714/734 |
| 9,819,268 | B2 * | 11/2017 | Thomas | H02M 3/1588 |
| 2008/0018314 | A1 * | 1/2008 | Sheng | H02M 3/157 |
| | | | | 323/285 |

\* cited by examiner

SWITCHING CONVERTER HAVING PULSE SKIPPING MODE AND CONTROL METHOD THEREOF

CROSS REFERENCE

The present invention claims priority to TW 112101416 filed on Jan. 12, 2023.

BACKGROUND OF THE INVENTION

Field of Invention

The present invention relates to a switching converter and control method thereof, in particular to a switching converter and control method, both of which have pulse skipping mode.

Description of Related Art

In a prior art switching converter having pulse skipping mode and operating in current mode, when the load current is lower than a preset level during light-load condition or during load transient, the prior art switching converter enters a pulse skipping mode. The U.S. Pat. No. 8,587,283B2 discloses a switching converter having pulse skipping mode. When the switching converter operates in the pulse skipping mode, the error amplifier compares the clamping voltage Vclmp having a fixed level with the error voltage Vrr, so as to determine whether to enter the pulse skipping mode or not based on the comparison result.

A drawback of the above-mentioned prior art is that since the clamping voltage Vclmp is a fixed level, when the input voltage and/or the output voltage varies, the judgment for entering the pulse skipping mode could go wrong. As a undesirable result, the switching converter can only be applicable for input voltage and output voltage having fixed-levels, which limits the application scope of the switching converter.

Compared with the above-mentioned prior art, the switching converter of the present invention can adaptively adjust the judgment criterion of whether to enter the pulse skipping mode or not when the input voltage and/or output voltage varies, thereby improving the application scope of the switching converter.

SUMMARY OF THE INVENTION

The present invention provides a switching converter having pulse skipping mode, comprising: a power stage circuit, configured to switch at least one power switch of the power stage circuit according to an adjusted pulse width modulation (PWM) signal to convert an input power to generate an output power; a feedback control circuit, configured to compare an output voltage division of an output voltage related to the output power with a reference voltage to generate an error amplification signal, and comparing the error amplification signal with a ramp signal to generate an initial PWM signal; an operating signal generator circuit, configured to mask a part of pulses of a clock signal according to a pulse width of a pulse skipping signal to generate a setting signal to generate the adjusted PWM signal according to the initial PWM signal and the setting signal; and a pulse skipping circuit, configured to compare the error amplification signal with a pulse skipping reference signal to generate the pulse skipping signal; wherein the pulse skipping circuit adaptively generates a duty ratio signal according to an input voltage of the input power and the output voltage, so as to generate the pulse skipping reference signal, wherein a level of the pulse skipping reference signal is related to a duty ratio of the adjusted PWM signal which is during an unmasked period; and wherein the ramp signal is related to a rising inductor current or a falling inductor current of an inductor current flowing through an inductor of the power stage circuit, wherein the rising inductor current corresponds to a portion of the inductor current keeping rising and the falling inductor current corresponds to another portion of the inductor current keeping falling.

The present invention provides a control method of a switching converter having pulse skipping mode, configured to convert an input power to generate an output power, wherein the control method of the switching converter having pulse skipping mode comprises: comparing an output voltage division related to an output voltage of the output power with a reference voltage to generate an error amplification signal; comparing the error amplification signal with a ramp signal to generate an initial PWM signal; adaptively generating a duty ratio signal according to an input voltage of the input power and the output voltage, so as to generate a pulse skipping reference signal, wherein a level of the pulse skipping reference signal is related to a duty ratio of the adjusted PWM signal which is during an unmasked period; comparing the error amplification signal with the pulse skipping reference signal to generate a pulse skipping signal; masking a part of pulses of a clock signal according to the pulse width of the pulse skipping signal to generate a setting signal to generate an adjusted PWM signal according to the initial PWM signal and the setting signal; and switching at least one power switch of a power stage circuit according to the adjusted PWM signal to convert the input power to generate the output power; wherein the ramp signal indicates a rising inductor current or a falling inductor current of an inductor current flowing through an inductor of the power stage circuit, wherein the rising inductor current corresponds to a portion of the inductor current keeping rising and the falling inductor current corresponds to another portion of the inductor current keeping falling.

In one embodiment, the feedback control circuit includes: an error amplifier, configured to compare the output voltage division with the reference voltage to generate the error amplification signal; and a first comparator, configured to compare the error amplification signal and the ramp signal to generate the initial PWM signal; wherein the feedback control circuit, the operating signal generator circuit, and the power stage circuit form a feedback circuit for feedback control of the error amplification signal related to the ramp signal.

In one embodiment, the pulse skipping circuit includes: a duty ratio timing circuit, configured to generate a duty ratio timing signal according to the input voltage and the output voltage; an integration circuit, configured to perform an integral operation to generate an integral signal during a duration in which the pulse width of the duty ratio timing signal indicates that the inductor current is corresponded to the rising inductor current or the falling inductor current; a sample-and-hold circuit, configured to sample and hold a peak value of the integral signal to generate the pulse skipping reference signal; and a second comparator, configured to compare the error amplification signal with the pulse skipping reference signal to generate the pulse skipping signal.

In one embodiment, the power stage circuit includes a buck power stage circuit, wherein the duty ratio timing circuit includes: a first charging circuit, including a first current source and a first capacitor, wherein the first current source generates a first charging current according to the input voltage, so as to charge the first capacitor to generate a first voltage; a third comparator, configured to compare the output voltage with the first voltage to generate the duty ratio timing signal, so that the pulse width of the duty ratio timing signal is proportional to a ratio of the output voltage divided by the input voltage; and a reset switch, coupled to the first charging circuit, configured to reset the first capacitor according to the clock signal, wherein a frequency of the clock signal is the same as a frequency of the adjusted PWM signal during the unmasked period.

In one embodiment, the integration circuit includes a second current source and a second capacitor, wherein the second current source generates a constant current, so as to charge the second capacitor to generate the integral signal during a duration in which the pulse width of the duty ratio timing signal indicates that the inductor current is corresponded to the rising inductor current or the falling inductor current.

In one embodiment, the integration circuit further includes a third current source for generating a differential current related to the input voltage minus the output voltage, so as to further charge the second capacitor to generate the integral signal during a duration in which the pulse width of the duty ratio timing signal indicates that the inductor current is corresponded to the rising inductor current or the falling inductor current.

In one embodiment, the power stage circuit includes an inverse buck-boost power stage circuit, wherein the duty ratio timing circuit includes: a first charging circuit, including a fourth current source, a fifth current source, and a first capacitor, wherein the fourth current source generates a fourth charging current according to the input voltage, the fifth current source generates a fifth charging current according to the output voltage, and the fourth charging current and the fifth charging current are configured to charge the first capacitor to generate a first voltage; a third comparator, configured to compare the output voltage with the first voltage to generate the duty ratio timing signal, so that the pulse width of the duty ratio timing signal is proportional to a ratio of the output voltage divided by a sum of the input voltage and the output voltage; and a reset switch, coupled to the first charging circuit, configured to reset the first capacitor according to the clock signal, wherein a frequency of the clock signal is the same as a frequency of the adjusted PWM signal during the unmasked period.

In one embodiment, the integration circuit includes a second current source and a second capacitor, wherein the second current source generates a constant current, so as to charge the second capacitor to generate the integral signal during a duration in which the pulse width of the duty ratio timing signal indicates that the inductor current is corresponded to the rising inductor current or the falling inductor current.

In one embodiment, the integration circuit further includes a third current source for generating a differential current related to the input voltage minus the output voltage, so as to further charge the second capacitor to generate the integral signal during a duration in which the pulse width of the duty ratio timing signal indicates that the inductor current is corresponded to the rising inductor current or the falling inductor current.

In one embodiment, the power stage circuit includes a boost power stage circuit, wherein the pulse width of the duty ratio timing signal is proportional to one minus a ratio of the input voltage divided by the output voltage.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
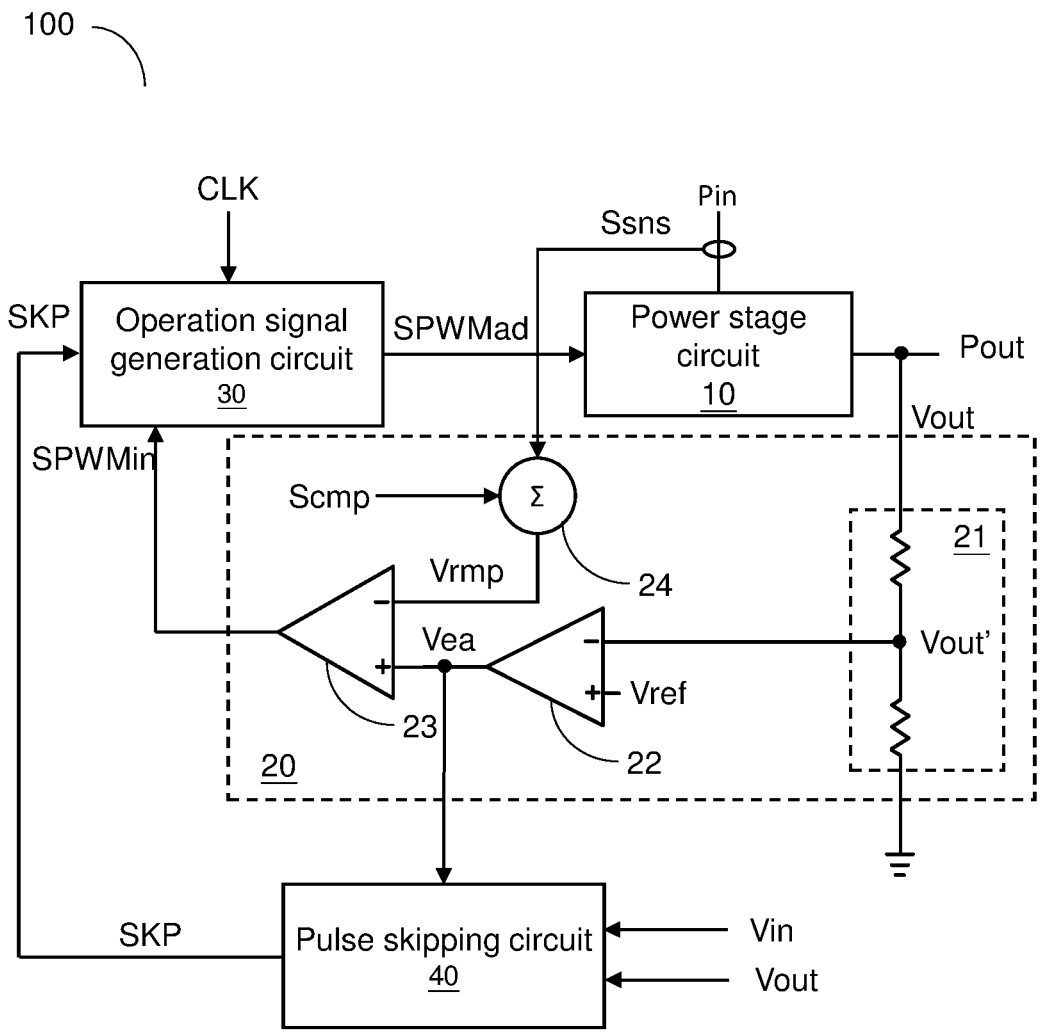
FIG. 1 shows an embodiment of a switching converter according to the present invention.

Please refer to FIG. 1. FIG. 1 shows a switching converter (switching converter 100) according to an embodiment of the present invention. The switching converter 100 is configured to convert the input power Pin to generate the output power Pout. In an embodiment, the switching converter 100 includes: a power stage circuit 10, a feedback control circuit 20, an operating signal generator circuit 30, and a pulse skipping circuit 40. In an embodiment, the power stage circuit 10 is configured to switch at least one power switch (not shown herein, but will be described in detail later) of the power stage circuit 10 according to the adjusted pulse width modulation (PWM) signal SPWMad to convert the input power Pin to generate the output power Pout.

In the present embodiment, the feedback control circuit 20 includes a voltage divider circuit 21, an error amplifier 22, a first comparator 23, and an adder 24. In an embodiment, the output voltage Vout of the output power Pout is divided by the voltage divider circuit 21 to generate the output voltage division Vout'. The error amplifier 22 is configured to compare the reference voltage Vref with the output voltage division Vout' to generate an error amplification signal Vea. The reference voltage Vref is, for example, related to a target voltage of the output voltage Vout, and the feedback control circuit 20 adjusts the output voltage Vout to the target voltage related to the reference voltage Vref through feedback control.

In the present embodiment, the current sensing signal Ssns is a sensing signal of a rising inductor current and/or a falling inductor current of an inductor current flowing through an inductor in the power stage 10. The adder 24 superimposes the current sensing signal Ssns and the slope compensation signal Scmp which are synchronized with the switching frequency to generate a ramp signal Vrmp which has a larger amplitude and is consequently more stable. The first comparator 23 is configured to compare the error amplification signal Vea and the ramp signal Vrmp to generate the initial PWM signal SPWMin. The adder 24 is usually adopted in the feedback control of the current mode as in the present embodiment. In prior art where only the current sensing signal Ssns generated by the inductor current is used to compare with the error amplification signal Vea. A sub-harmonic phenomenon tends to occur. Note that, harmonic phenomenon includes pulses alternating between a high duty ratio and a signal and a low duty ratio. Although the average duty ratio is still correct, noise will be undesirably introduced. This issue can be solved by adding the slope compensation signal Scmp, which is well known by those skilled in the art, and will not be repeated here. In an embodiment, as shown in FIG. 1, the feedback control circuit 20, the operating signal generator circuit 30, and the power stage circuit 10 form a feedback circuit for feedback control, such that the error amplification signal Vea is related to the ramp signal Vrmp.

In the present embodiment, the operating signal generator circuit 30 is configured to mask a part of the pulses of the clock signal CLK according to the pulse width of the pulse skipping signal SKP to generate a setting signal SET (not shown herein, but will be described in detail later), and to generate the adjusted PWM signal SPWMad according to the initial PWM signal SPWMin and the setting signal SET. The pulse skipping circuit 40 is configured to compare the error amplification signal Vea with the pulse skipping reference signal Vpsm (not shown herein, but will be described in detail later) to generate the pulse skipping signal SKP. The pulse skipping circuit 40 adaptively generates a duty ratio signal Sio (not shown herein, but will be described in detail later) according to the input voltage Vin of the input power Pin and the output voltage Vout, so as to generate a pulse skipping reference signal Vpsm. The level of the pulse skipping reference signal Vpsm is related to the duty ratio of the initial PWM signal SPWMin.

Figure 2:
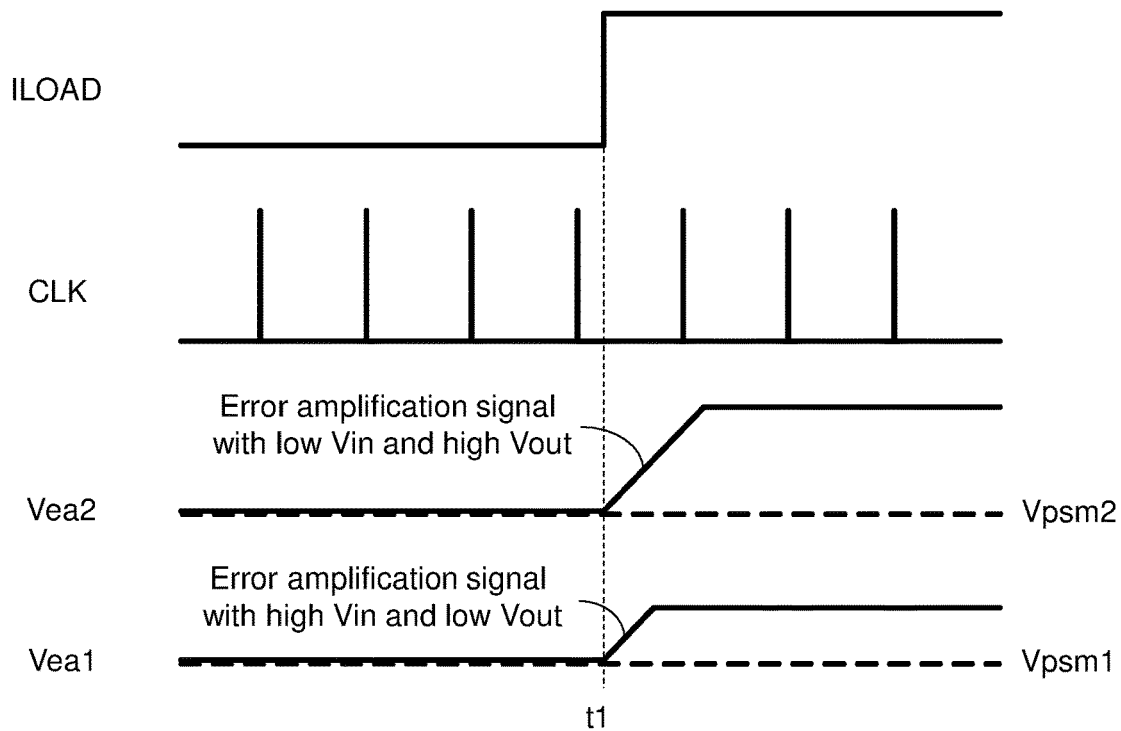
FIG. 2 shows a schematic diagram of related signal waveforms of a switching converter according to the present invention.

FIG. 2 shows a schematic diagram of related signal waveforms of a switching converter having pulse skipping mode according to the present invention. As shown in FIG. 2, the error amplification signal Vea1 under the condition of high input voltage Vin and low output voltage Vout has a relatively lower level than the error amplification signal Vea2 under the condition of low input voltage Vin and high output voltage Vout. Note that, the so-called high and low are relative values, which means that the difference in level and relative high-low comparison between the input voltage Vin and the output voltage Vout or other signals. When the load current ILOAD supplied by the output power Pout switches from a lower level to a higher level at the time point t1, the error amplification signal Vea1 and the error amplification signal Vea2 correspondingly increase in level at the time point t1 respectively. In the above case, if the pulse skipping reference signal is a constant (for example only the pulse skipping reference signal Vpsm1), then the present switching converter is only suitable for the condition of high input voltage Vin and low output voltage Vout. And the same configuration of the pulse skipping reference signal cannot be applicable under the condition of low input voltage Vin and high output voltage Vout because the pulse skipping reference signal Vpsm1 is always lower than the error amplification signal Vea2 no matter the load current ILOAD is high or low, so that the pulse skipping mode will not be entered.

Therefore, the present invention proposes variable pulse skipping reference signals Vpsm1 and Vpsm2 adaptively generated according to the level changes of the input voltage Vin and the output voltage Vout, so as to be applicable in broader application scope for different combinations of the input voltage Vin and the output voltage Vout. The advantages of the present invention at least include broader application range, high power conversion efficiency, and lower energy loss. Meanwhile, the clock signal CLK is also used to generate the initial PWM signal SPWMin, and the frequency of the clock signal CLK is the same as that of the initial PWM signal SPWMin.

Figure 3:
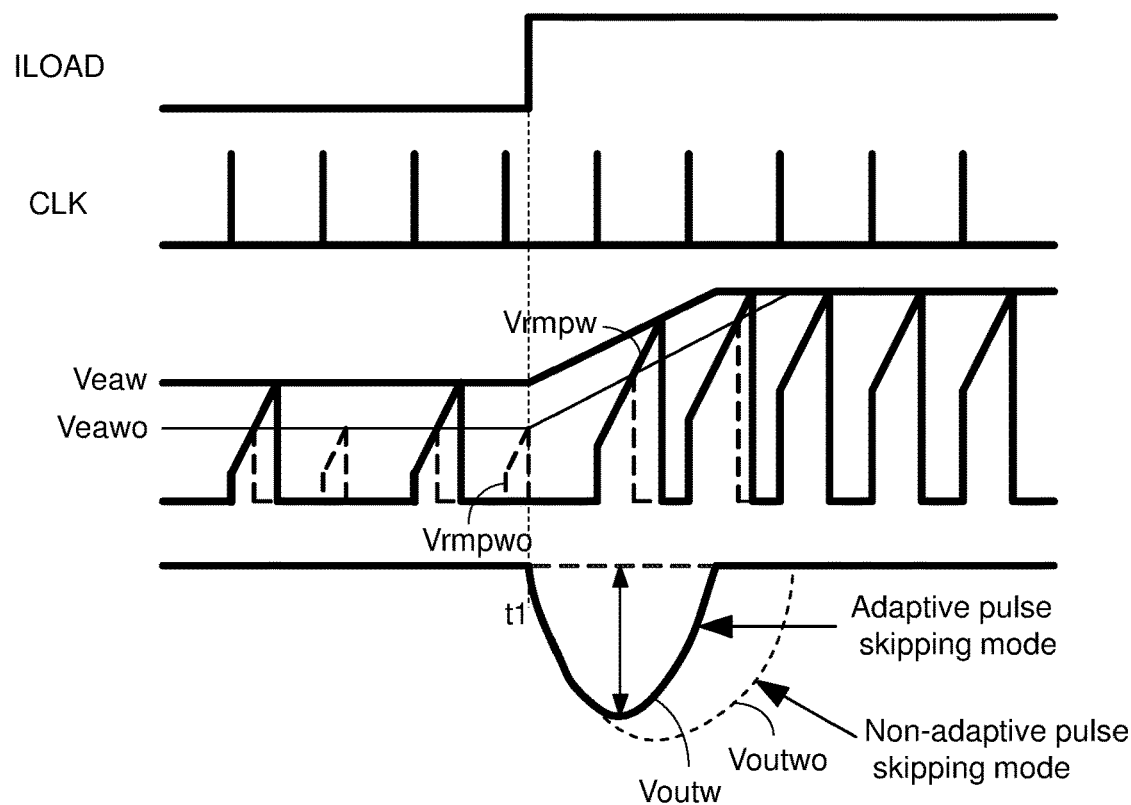
FIG. 3 is a schematic diagram showing a comparison of related signal waveforms between an adaptive pulse skipping mode according to the present invention and a non-adaptive pulse skipping mode.

FIG. 3 is a schematic diagram showing a comparison of related signal waveforms between an adaptive pulse skipping mode according to the present invention and a non-adaptive pulse skipping mode. As shown in FIG. 3, the load current ILOAD supplied by the output power Pout and the clock signal CLK are similar to those shown in FIG. 2, and the load current ILOAD switches from a lower level to a higher level at time point t1. FIG. 3 aims to show comparison of the ramp signal, error amplification signal, and output voltage between the adaptive pulse skipping mode and non-adaptive pulse skipping mode.

For example, the operation condition of FIG. 3 is low input voltage Vin and high output voltage Vout, corresponding to the same part of conditions shown in FIG. 2. During light load conditions, i.e., before the time point t1, when the load current ILOAD is relatively low, pulses of the ramp signal Vrmpwo with the non-adaptive pulse skipping mode rise in synchronous with each pulse of the clock signal CLK until the level reaches the error amplification signal Veawo. On the contrary, a part of pulses of the ramp signal Vrmpw with the adaptive pulse skipping mode are skipped and do not rise in synchronous with corresponding part of pulses of the clock signal CLK. In other words, a part of pulses of the clock signal CLK are skipped and are not adopted to operate the power switch of the power stage circuit. Only the other part of pulses of the ramp signal Vrmpw with the adaptive pulse skipping mode will rise in synchronous with corresponding part of pulses of the clock signal CLK until the level reaches the error amplification signal Veaw. Therefore, the switching converter having adaptive pulse skipping mode according to the present invention can reduce the switching loss of the power switch, reduce the energy loss, and improve the power conversion efficiency.

When the load current ILOAD is switched from a lower level to a higher level at time point t1, the output voltage Voutw of the switching converter having adaptive pulse skipping mode according to the present invention, compared with the output voltage Voutwo of the switching converter having non-adaptive pulse skipping mode (for example, the pulse skipping reference signal remains constant), has a shorter transient response period, and reaches the regulation target of the output voltage faster. In other words, the steady state faster can be reached faster.

Figure 4:
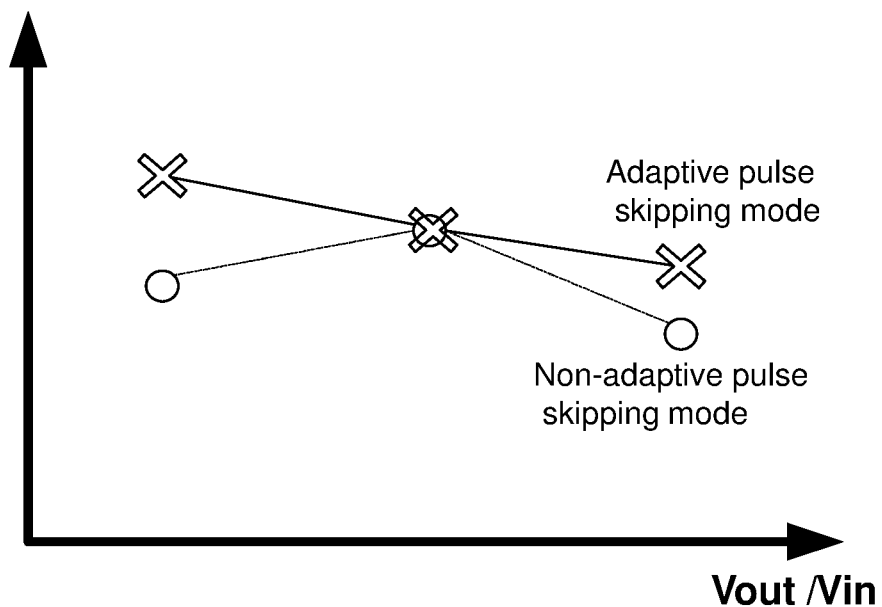
FIG. 4 is a schematic diagram showing a comparison of power conversion efficiency between an adaptive pulse skipping mode according to the present invention and a non-adaptive pulse skipping mode.

FIG. 4 is a schematic diagram showing a comparison of power conversion efficiency between an adaptive pulse skipping mode according to the present invention and a non-adaptive pulse skipping mode. As shown in FIG. 4, the horizontal axis represents the ratio of the output voltage Vout to the input voltage Vin, and the vertical axis represents the power conversion efficiency. FIG. 4 shows that in most combinations of the output voltage Vout and the input voltage Vin, the power conversion efficiency of the switching converter having the adaptive pulse skipping mode according to the present invention is significantly higher than the power conversion efficiency of the switching converter having the non-adaptive pulse skipping mode.

Figure 5:
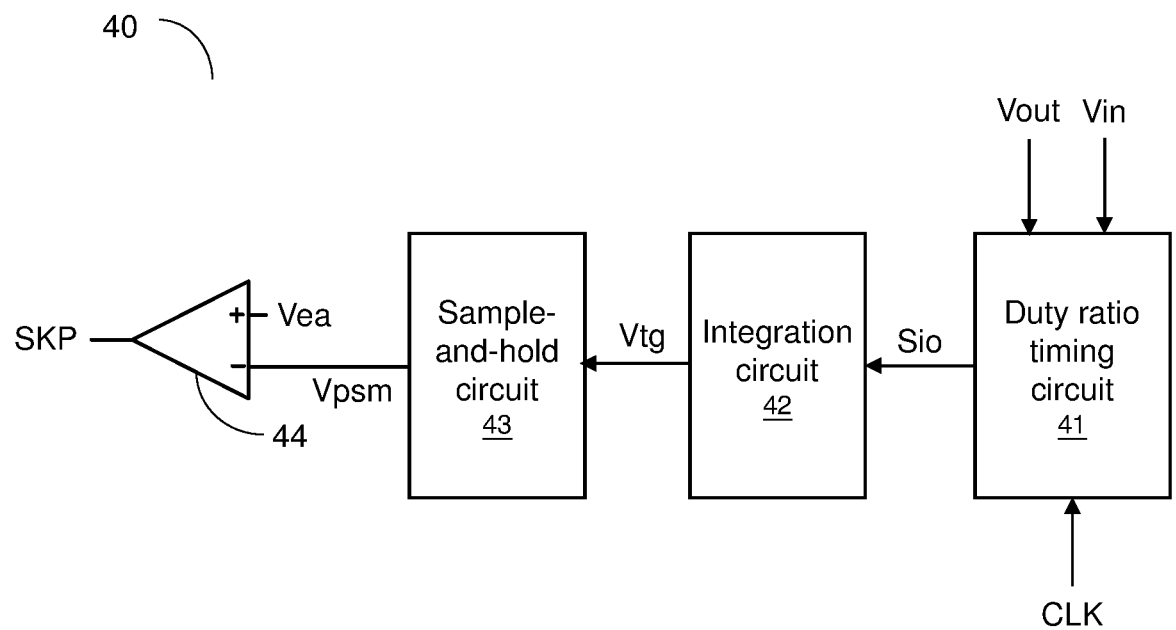
FIG. 5 shows a block diagram of a pulse skipping circuit according to an embodiment of the present invention.

FIG. 5 shows a block diagram of a pulse skipping circuit according to an embodiment of the present invention. As shown in FIG. 5, the pulse skipping circuit 40 includes, for example, a duty ratio timing circuit 41, an integration circuit 42, a sample-and-hold circuit 43, and a second comparator 44. The duty ratio timing circuit 41 is configured to generate the duty ratio timing signal Sio according to the input voltage Vin and the output voltage Vout. In one embodiment, the duty ratio timing circuit 41 further selects different circuit combinations to generate the duty ratio timing signal Sio according to the type of the power stage circuit 10, so as to be applicable to different duty ratio calculation methods applicable for different power stage circuits 10. For example, when the power stage circuit 10 is a buck power stage circuit, the pulse width of the duty ratio timing signal Sio generated by the duty ratio timing circuit 41 is proportional to a ratio of the output voltage Vout divided by the input voltage Vin (that is, Vout/Vin). When the power stage circuit 10 is a boost power stage circuit, the pulse width of the duty ratio timing signal Sio generated by the duty ratio timing circuit 41 is proportional to one minus a ratio of the input voltage Vin divided by the output voltage Vout (that is, 1−(Vin/Vout)). When the power stage circuit 10 is an inverse buck-boost power stage circuit, the pulse width of the duty ratio timing signal Sio generated by the duty ratio timing circuit 41 is proportional to a ratio of the output voltage Vout divided by the sum of the input voltage Vin and the output voltage Vout (that is, Vout/(Vin+Vout)). Note that, the pulse width of the duty ratio timing signal Sio indicates, for example, a duration during which the inductor current of the power stage circuit 10 is keeping rising (correspond to a rising inductor current) or is keeping falling. The portion of the inductor current keeping rising corresponds to a rising inductor current and the portion of inductor current keeping falling corresponds to a falling inductor current.

Please continue to refer to FIG. 5, the integration circuit 42 is configured to perform the integral operation to generate the integral signal Vtg during the duration of the pulse width of the duty ratio timing signal Sio, so that the integral signal Vtg can be used to indicate the duty ratio of the power stage circuit 10. Note again that the duration of the pulse width of the duty ratio timing signal Sio indicates that the inductor current is corresponding to the rising inductor current or corresponding to the falling inductor current. The sample-and-hold circuit 43 is configured to sample and hold the peak value of the integral signal Vtg to generate the pulse skipping reference signal Vpsm. The second comparator 44 is configured to compare the error amplification signal Vea with the pulse skipping reference signal Vpsm to generate the pulse skipping signal SKP.

Figure 6:
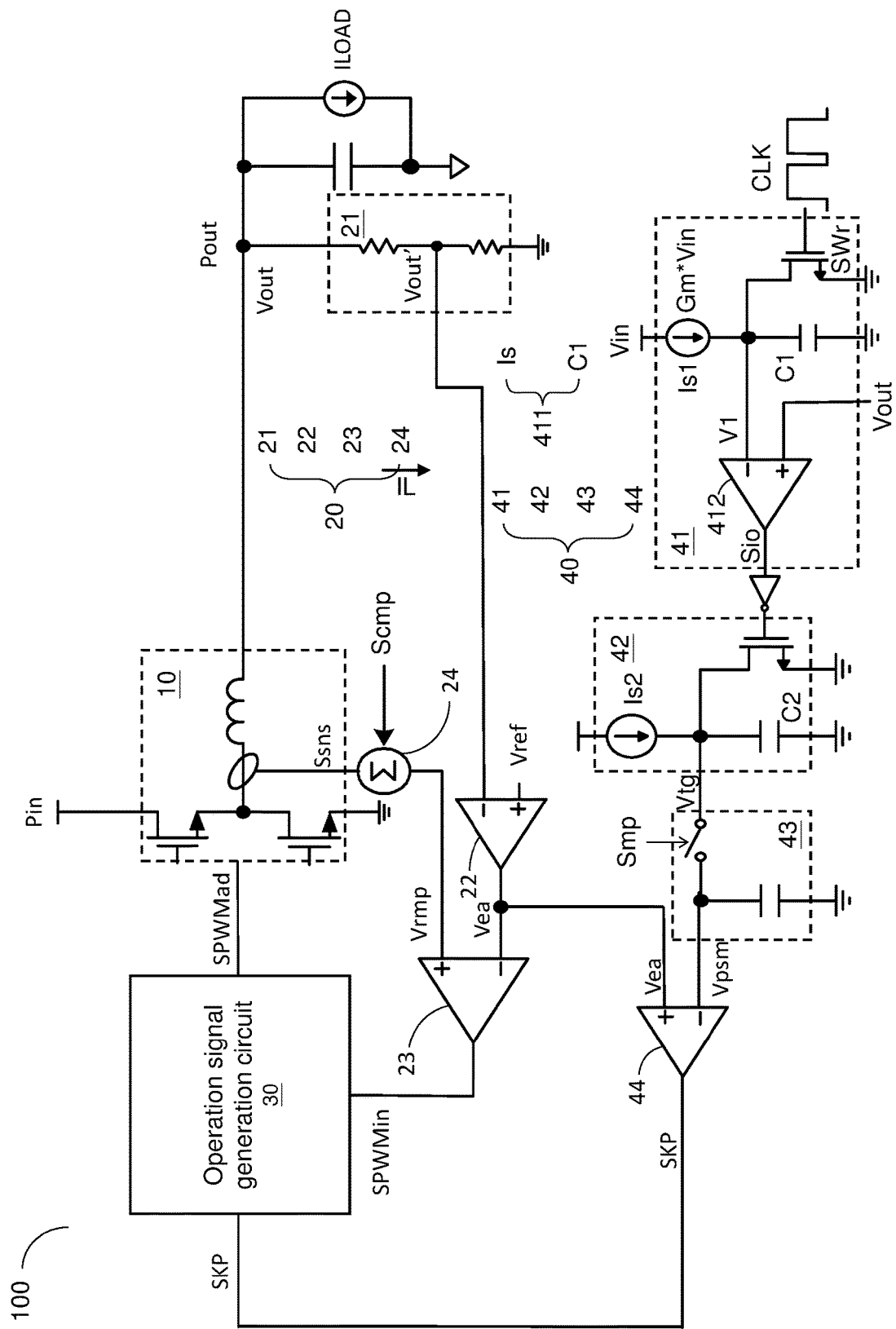
FIG. 6 shows a switching converter according to an embodiment of the present invention.

FIG. 6 shows a switching converter according to an embodiment of the present invention. As shown in FIG. 6, the power stage circuit 10 is, for example, a buck power stage circuit. In the present embodiment, the feedback control circuit 20 and the operating signal generator circuit 30 are similar to the embodiment shown in FIG. 1, and will not be repeated here. The present embodiment shows a more specific embodiment of the pulse skipping circuit 40. As shown in FIG. 6, the corresponding power stage circuit 10 is a buck power stage, and the pulse skipping circuit 40 includes a duty ratio timing circuit 41, an integration circuit 42, a sample-and-hold circuit 43, and a second comparator 44.

The duty ratio timing circuit 41 includes, for example, a first charging circuit 411, a third comparator 412, and a reset switch SWr. The first charging circuit 411 includes a first current source Is1 and a first capacitor C1. The first current source Is1 generates a first charging current according to the input voltage Vin, so as to charge the first capacitor C1 to generate the first voltage V1. The current level of the first current source Is1 is, for example, the conductance Gm multiplied by the input voltage Vin. The third comparator 412 is configured to compare the output voltage Vout with the first voltage V1 to generate the duty ratio signal Sio, so that the pulse width of the duty ratio signal Sio is proportional to a ratio of the output voltage Vout divided by the input voltage Vin. The reset switch SWr is coupled to the first charging circuit 411 for resetting the first capacitor C1 according to the clock signal CLK, wherein the frequency of the clock signal CLK is the same as the frequency of the initial PWM signal SPWMin.

Please continue to refer to FIG. 6, the integration circuit 42 includes a second current source Is2 and a second capacitor C2. The second current source Is2 generates a constant current to charge the second capacitor C2 during the duration (i.e. the duration of the pulse width) in which the duty ratio timing signal Sio indicates that the inductor current is corresponded to the rising inductor current or the falling inductor current, so as to generate the integral signal Vtg. The sample-and-hold circuit 43 includes, for example, a switch and a capacitor as shown in FIG. 6. When the integral signal Vtg reaches the peak value, the switch is operated with the sampling signal Smp, such that the peak value of the integral signal Vtg is held by the capacitor to generate the pulse skipping reference signal Vpsm. The second comparator 44 is configured to compare the error amplification signal Vea with the pulse skipping reference signal Vpsm to generate the pulse skipping signal SKP.

Figure 7:
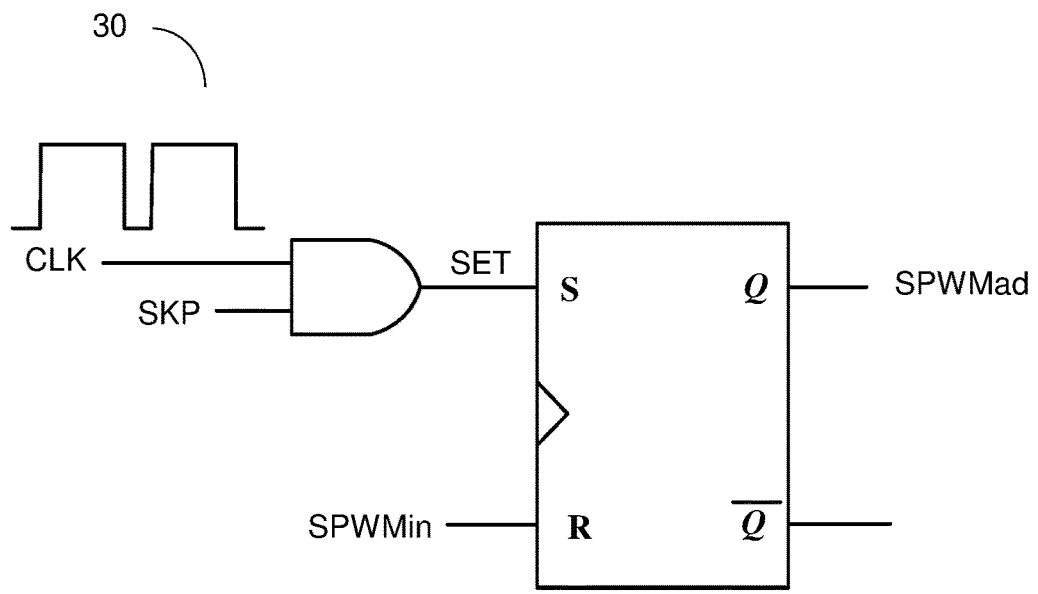
FIG. 7 shows an operating signal generator circuit according to a more specific embodiment of the present invention.

FIG. 7 shows a more specific embodiment of the operating signal generator circuit according to the present invention. As shown in FIG. 7, the operating signal generator circuit 30 includes, for example but not limited to, a logic AND gate and an SR latch circuit. The logic AND gate performs the AND logic operation on the clock signal CLK and the pulse skipping signal SKP to generates a setting signal SET which is coupled to the setting pin S of the SR latch circuit. The frequency of the clock signal CLK is the same as the frequency of the adjusted PWM signal SPWMad which is during the unmasked period. The so-called unmasked period is referred to the period in which the clock signal CLK is not masked by the pulse skipping signal SKP so that the generated setting signal SET has pulses within. Since the adjusted PWM signal SPWMad also has pulses at the same time when the setting signal SET has pulses, therefore, the frequency and duty ratio of the adjusted PWM signal SPWMad refer to such unmasked period. The reset pin R of the SR latch circuit receives the initial PWM signal SPWMin, while the output pin Q generates the adjusted PWM signal SPWMad. The operating signal generator circuit of the present embodiment is a more specific embodiment, and is not intended to limit the broadest scope of the operating signal generator circuit of the present invention. Those skilled in the art can conceive of various other implementations based on the teaching of the present embodiment, as long as the pulse skipping signal SKP can be used to mask a part of the pulses of the clock signal CLK to generate an adjusted PWM signal SPWMad.

Figure 8:
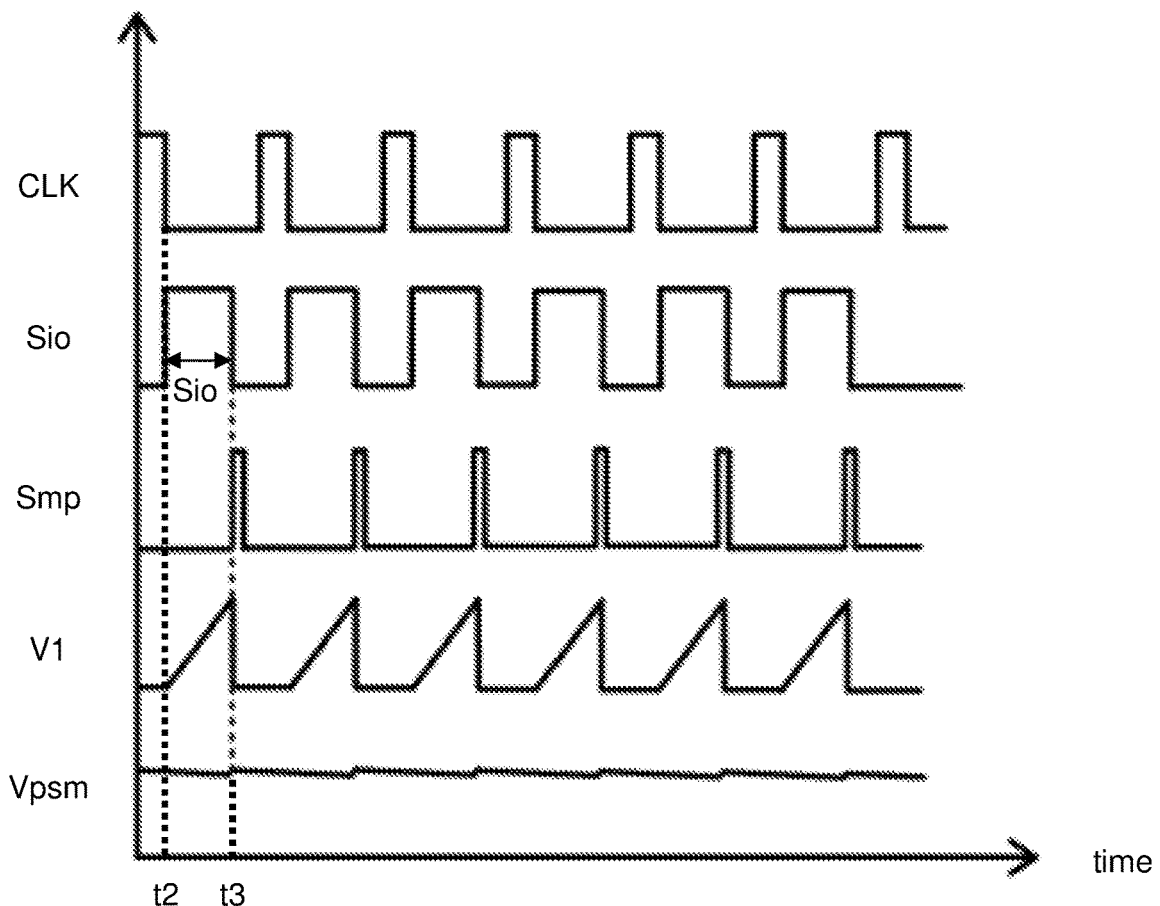
FIG. 8 shows a schematic diagram of related signal waveforms of the pulse skipping circuit according to the present invention.

FIG. 8 shows a schematic diagram of related signal waveforms of the pulse skipping circuit according to the present invention. As shown in FIG. 8 and referring to FIG. 6, taking the power stage circuit 10 as a buck power stage circuit as an example, at time point t2 when the clock signal CLK is switched from a high level to a low level and the reset switch SWr is turned off, a first current source Is1 charges a first capacitor C1 with a first charging current (Gm*Vin), so that the potential of the first voltage V1 increases gradually. At time point t3, the potential of the first voltage V1 exceeds the output voltage Vout, and the duty ratio signal Sio switches from a high level to a low level. During the period from time point t2 to time point t3, the second current source Is2 generates a constant current to charge the second capacitor C2 to generate the integral signal Vtg. The sample-and-hold circuit 43 operates the switch by the sampling signal Smp when the integral signal Vtg reaches the peak value at the time point t3, and holds the peak value of the integral signal Vtg with the capacitor to generate the pulse skipping reference signal Vpsm. The relationship among the duration Ton in which the duty ratio timing signal Sio indicates that the inductor current IL is corresponded to the rising inductor current or the falling inductor current, the input voltage Vin, and the output voltage Vout is shown in equation 1:

$$\text{Ton} = \frac{C1 * Vout}{Gm * Vin} \qquad \text{equation 1}$$

The relationship between the pulse skipping reference signal Vpsm, the input voltage Vin and the output voltage Vout is shown in equation 2:

$$Vpsm = \frac{Is2 * \text{Ton}}{C2} = \frac{Is2 * C1 * Vout}{C2 * Gm1 * Vin} = k * \frac{Vout}{Vin} \qquad \text{(equation 2)}$$

where k is (Is2*C1)/(C2*Gm1)

Figure 9:
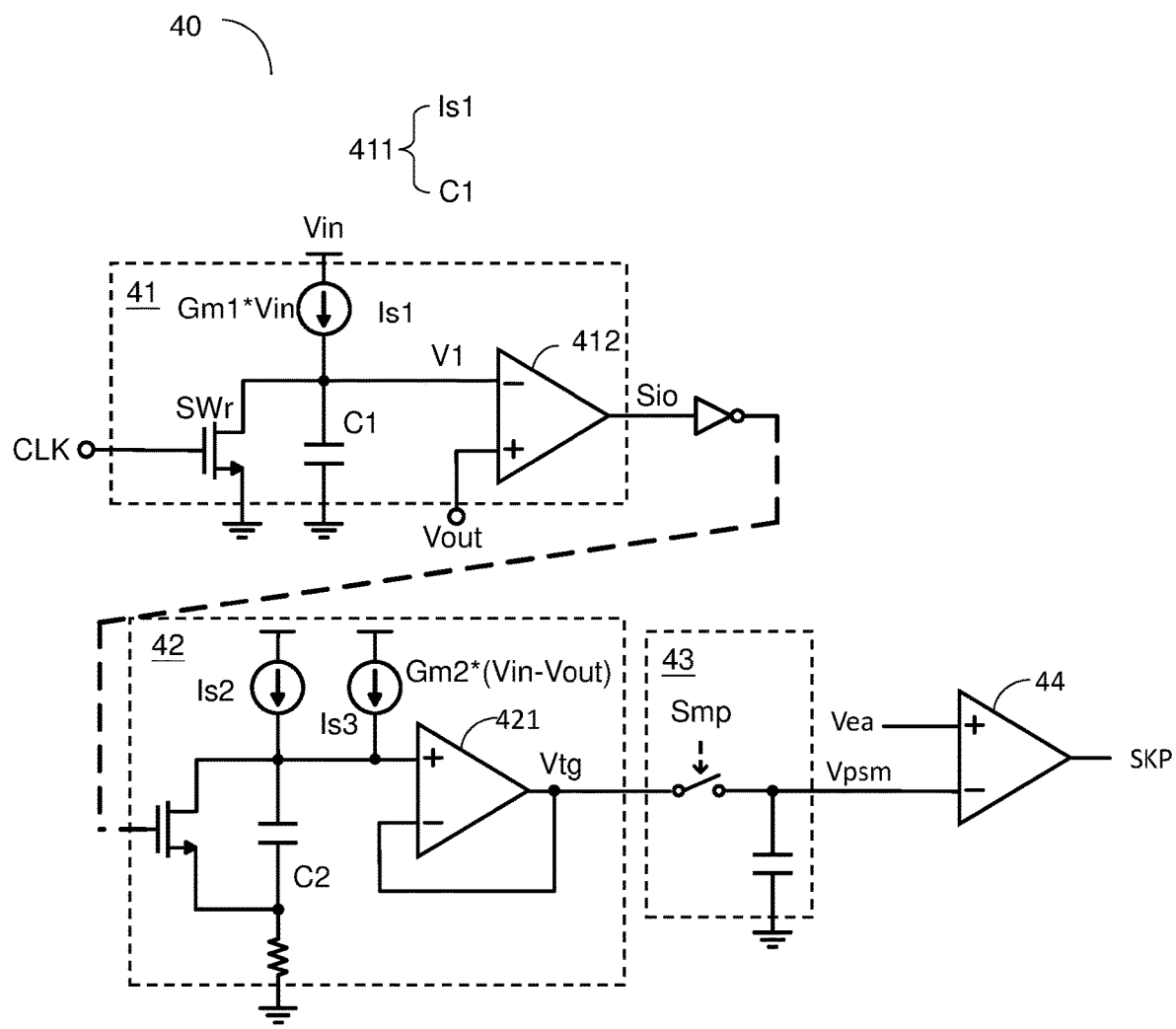
FIG. 9 shows a pulse skipping circuit according to a more specific embodiment of the present invention.

FIG. 9 shows a more specific embodiment of the pulse skipping circuit according to the present invention. The pulse skipping circuit 40 shown in FIG. 9 is configured to operate with a buck power stage circuit. The pulse skipping circuit 40 includes a duty ratio timing circuit 41, an integration circuit 42, a sample-and-hold circuit 43, and a second comparator 44.

The duty ratio timing circuit 41 includes, for example, a first charging circuit 411, a third comparator 412, and a reset switch SWr. The first charging circuit 411 includes a first current source Is1 and a first capacitor C1. The first current source Is1 generates a first charging current according to the input voltage Vin to charge the first capacitor C1 to generate the first voltage V1. The current level of the charging current is, for example, the conductance Gm1 multiplied by the input voltage Vin. The third comparator 412 is configured to compare the output voltage Vout with the first voltage V1 to generate the duty ratio signal Sio, so that the pulse width of the duty ratio signal Sio is proportional to a ratio of the output voltage Vout divided by the input voltage Vin. The reset switch SWr is coupled to the first charging circuit 411 for resetting the first capacitor C1 according to the clock signal CLK, wherein the frequency of the clock signal CLK is the same as the frequency of the initial PWM signal SPWMin.

Please continue to refer to FIG. 9, the integration circuit 42 includes a second current source Is2, a third current source Is3, a second capacitor C2, and an amplifier 421. The second current source Is2 generates a constant current to charge the second capacitor C2 during the duration in which the pulse width of the duty ratio timing signal Sio indicates that the inductor current is corresponding to the rising inductor current or the falling inductor current. The third current source Is3 is configured to generate a differential current related to the input voltage Vin minus the output voltage Vout. The current level of the differential current is equal to Gm2*(Vin−Vout). The differential current generated by the third current source Is3 further charges the second capacitor C2 together with the constant current generated by the second current source Is2 to generate the integrated signal Vtg during the duration in which the pulse width of the duty ratio timing signal Sio indicates that the inductor current is corresponded to the rising inductor current or the falling inductor current. As shown in FIG. 9, for example, the sample-and-hold circuit 43 includes a switch and a capacitor. When the integral signal Vtg reaches the peak value, the switch is operated by the sampling signal Smp and thus the peak value of the integral signal Vtg is held on the capacitor, so as to generate the pulse skipping reference signal Vpsm.

Figure 10:
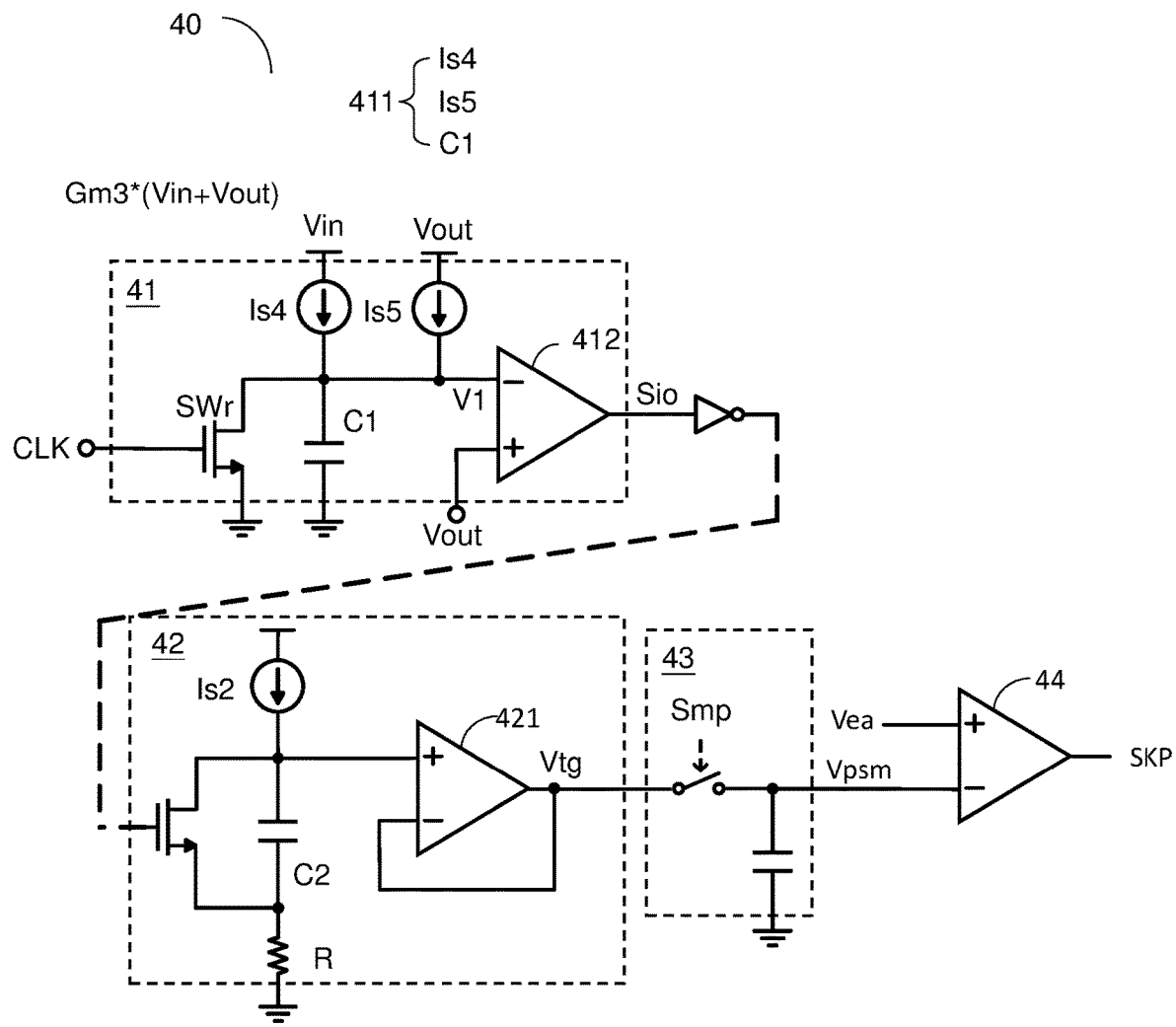
FIG. 10 shows a pulse skipping circuit according to another more specific embodiment of the present invention.

FIG. 10 shows another more specific embodiment of the pulse skipping circuit according to the present invention. The pulse skipping circuit 40 shown in FIG. 10 is configured to operate with an inverse buck-boost power stage circuit. The pulse skipping circuit 40 includes a duty ratio timing circuit 41, an integration circuit 42, a sample-and-hold circuit 43, and a second comparator 44.

The duty ratio timing circuit 41 includes, for example, a first charging circuit 411, a third comparator 412, and a reset switch SWr. The first charging circuit 411 includes a fourth current source Is4, a fifth current source Is5, and a first capacitor C1. The fourth current source Is4 generates a fourth charging current according to the input voltage Vin, and the fifth current source Is5 generates a fifth charging current according to the output voltage Vout. The current level of the sum of the fourth charging current and the fifth charging current is, for example, the conductance Gm3 multiplied by the sum of the input voltage Vin and the output voltage Vout. The fourth charging current and the fifth charging current are summed to charge the first capacitor C1 to generate the first voltage V1. The third comparator 412 is configured to compare the output voltage Vout with the first voltage V1 to generate the duty ratio signal Sio, so that the pulse width of the duty ratio signal Sio is proportional to a ratio of the output voltage Vout divided by the input voltage Vin. The reset switch SWr is coupled to the first charging circuit 411 for resetting the first capacitor C1 according to the clock signal CLK, wherein the frequency of the clock signal CLK is the same as the frequency of the initial PWM signal SPWMin.

Please continue to refer to FIG. 10, the integration circuit 42 includes a second current source Is2, a second capacitor C2, and an amplifier 421. The second current source Is2 generates a constant current to charge the second capacitor C2 during the duration in which the pulse width of the duty ratio timing signal Sio indicates that the inductor current is corresponded to the rising inductor current or the falling inductor current, so as to generate the integral signal Vtg. As shown in FIG. 10, for example, the sample-and-hold circuit 43 includes a switch and a capacitor. When the integral signal Vtg reaches the peak value, the switch is operated with the sampling signal Smp, such that the peak value of the integral signal Vtg is held by the capacitor to generate the pulse skipping reference signal Vpsm.

In the embodiment shown in FIG. 10, the relationship between the duration Ton, the input voltage Vin, and the output voltage Vout is shown in equation 3. Note that the duration Ton of the duty ratio timing signal Sio indicates that the inductor current IL is corresponded to the rising inductor current or the falling inductor current.

$$\text{Ton} = \frac{C1 * Vout}{Gm3 * (Vin + Vout)} \quad \text{(equation 3)}$$

The relationship between the pulse skipping reference signal Vpsm, the input voltage Vin, and the output voltage Vout is shown in equation 4:

$$Vpsm = \frac{Is2 * \text{Ton}}{C2} + Is2 * R = \quad \text{(equation 4)}$$
$$\frac{Is2 * C1 * Vout}{C2 * Gm3 * (Vin + Vout)} + Is2 * R = k * \frac{Vout}{Vin}$$

Similar to FIG. 9, in the embodiment shown in FIG. 10, the integration circuit 42, in one embodiment, may further include a third current source Is3 configured to generate a differential current related to the input voltage Vin minus the output voltage Vout. The current level of the differential current is equal to Gm2*(Vin−Vout). The differential current generated by the third current source Is3 further charges the second capacitor C2 together with the constant current generated by the second current source Is2 to generate the integrated signal Vtg during the duration in which the pulse width of the duty ratio timing signal Sio indicates that the inductor current is corresponded to the rising inductor current or the falling inductor current.

Figure 11:
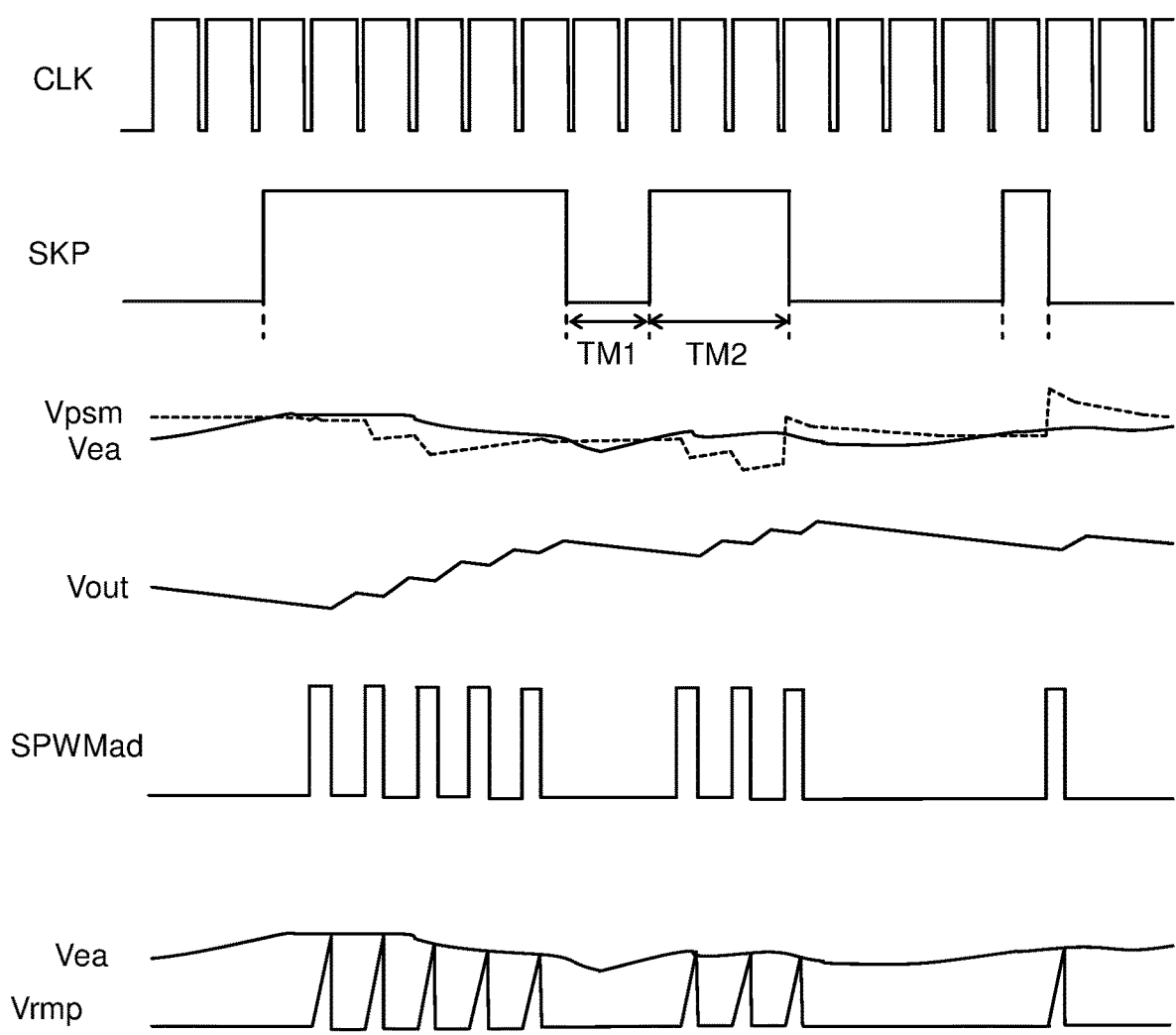
FIG. 11 shows an operation waveform diagram corresponding to the embodiment of the switching converter of the present invention shown in FIG. 6.
Figure 12A:
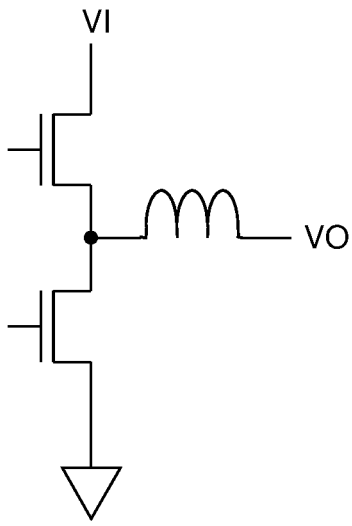
FIGS. 12A-12L show various embodiments of the power stage circuit of the switching converter of the present invention.
Figure 12B:
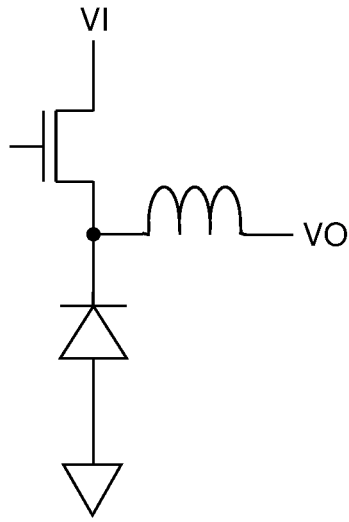
Figure 12C:
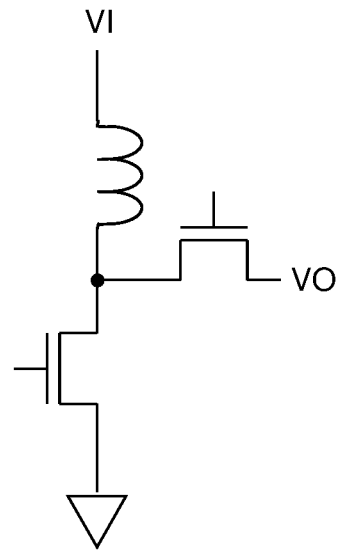
Figure 12D:
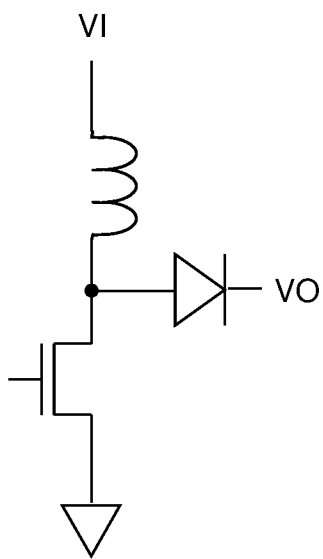
Figure 12E:
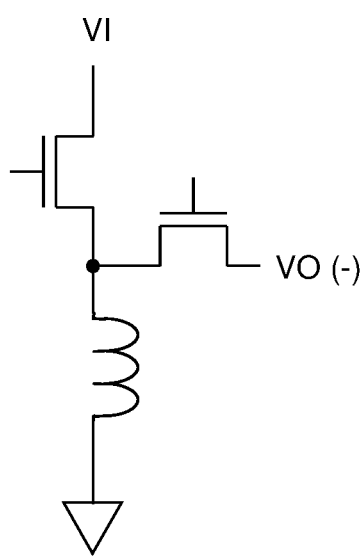
Figure 12F:
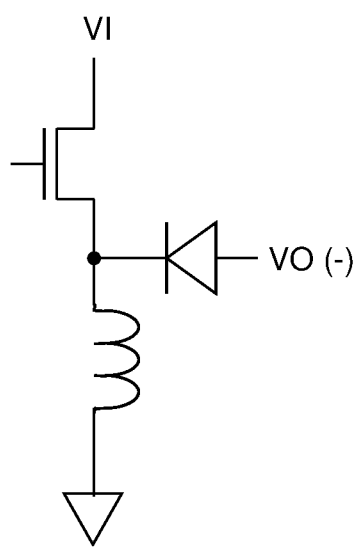
Figure 12G:
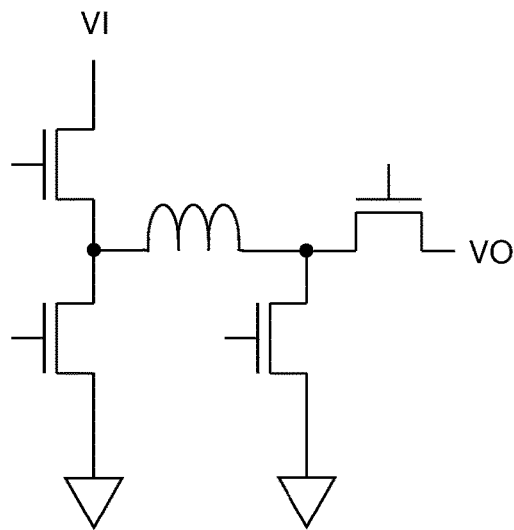
Figure 12H:
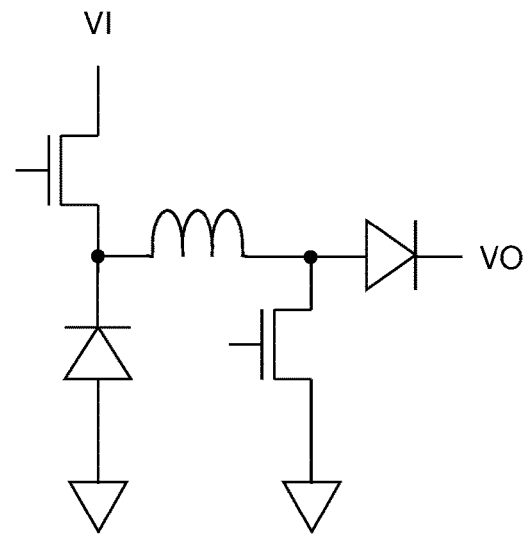
Figure 12I:
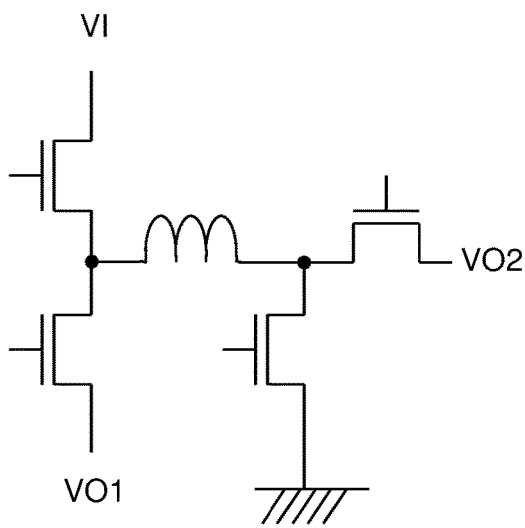
Figure 12J:
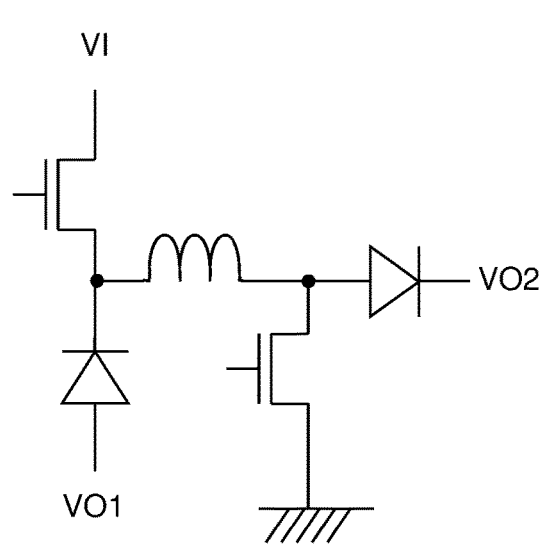
Figure 12K:
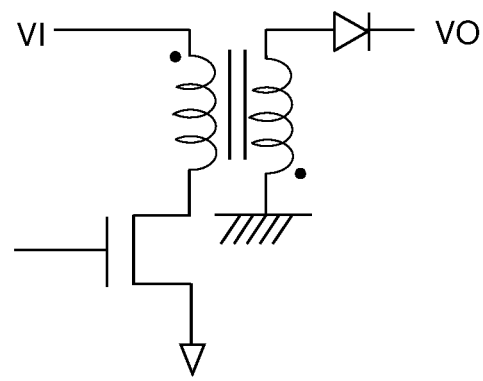
Figure 12L:
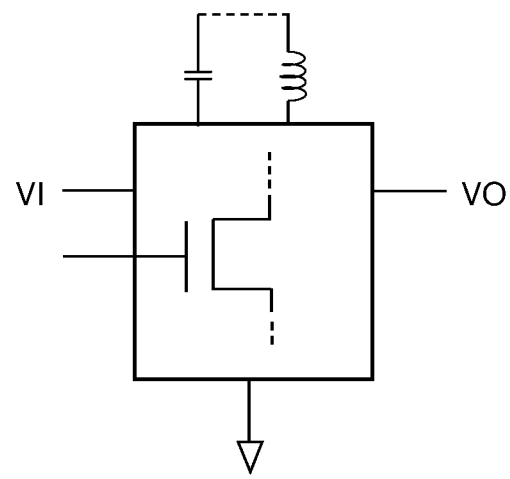

Please refer to FIG. 6 and FIG. 11 at the same time. FIG. 11 shows an operation waveform corresponding to FIG. 6 of an embodiment of the switching converter of the present invention. As shown in FIG. 11, the error amplification signal Vea is shown by the solid line in the third waveform diagram of FIG. 11, and the pulse skipping reference signal Vpsm is shown by the dotted line in the third waveform diagram of FIG. 11. In an embodiment, when the comparison result of the second comparator 44 indicates that the error amplification signal Vea is smaller than the pulse skipping reference signal Vpsm (such as during the masked period TM1 in FIG. 11), the pulse skipping signal SKP is switched to for example, a low level to control a part of the pulses of the clock signal CLK to be masked. Since the pulse skipping reference signal Vpsm is adaptively adjusted according to the input voltage Vin and the output voltage Vout, the skipping pulse of the pulse skipping signal SKP is determined by the error amplification signal Vea, the input voltage Vin and the output voltage Vout. As a result, pulses of the timing signal CLK are thereby masked according to the load current, the input voltage Vin and the output voltage Vout, so that the adjusted PWM signal SPWMad can adaptively skip corresponding pulses at light load according to the input voltage Vin and the output voltage Vout. Therefore, the switching loss of the power switch and the energy loss can be reduced, and the power conversion efficiency can be improved. The masked period TM1 and the unmasked period TM2 are shown in FIG. 11.

Please refer to FIG. 12A to FIG. 12L. FIG. 12A to FIG. 12L show various embodiments of the power stage circuit of the switching converter of the present invention. The power stage circuit includes at least one switch and an inductor coupled to each other, wherein at least one switch switches the inductor according to an operation signal to convert the input power to the output power. As shown in FIG. 12A to FIG. 12M, the power stage circuit includes, for example but not limited to, a boost converter, a buck converter, a buck-boost converter, or a switched resonant tank converter (STC).

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. The various embodiments described above are not limited to being used alone; two embodiments may be used in combination, or a part of one embodiment may be used in another embodiment. For example, other process steps or structures, such as a metal silicide layer, may be added. For another example, the lithography process step is not limited to the mask technology but it can also include electron beam lithography, immersion lithography, etc. Therefore, in the same spirit of the present invention, those skilled in the art can think of various equivalent variations and various combinations, and there are many combinations thereof, and the description will not be repeated here. The scope of the present invention should include what are defined in the claims and the equivalents.

What is claimed is:

1. A switching converter having pulse skipping mode, comprising: a power stage circuit, configured to switch at least one power switch of the power stage circuit according to an adjusted pulse width modulation (PWM) signal to convert an input power to generate an output power;

a feedback control circuit, configured to compare an output voltage division of an output voltage related to the output power with a reference voltage to generate an error amplification signal, and is configured to compare the error amplification signal with a ramp signal to generate an initial PWM signal;

an operating signal generator circuit, configured to mask a part of pulses of a clock signal according to a pulse width of a pulse skipping signal to generate a setting signal, and is configured to generate the adjusted PWM signal according to the initial PWM signal and the setting signal; and a pulse skipping circuit, configured to compare the error amplification signal with a pulse skipping reference signal to generate the pulse skipping signal;

wherein the pulse skipping circuit adaptively generates a duty ratio signal according to an input voltage of the input power and the output voltage, so as to generate the pulse skipping reference signal, wherein a level of the pulse skipping reference signal is related to a duty ratio of the adjusted PWM signal which is during an unmasked period; and wherein the ramp signal is related to a rising inductor current or a falling inductor current of an inductor current flowing through an inductor of the power stage circuit, wherein the rising inductor current corresponds to a portion of the inductor current keeping rising and the falling inductor current corresponds to another portion of the inductor current keeping falling.

2. The switching converter having pulse skipping mode of claim 1, wherein the feedback control circuit includes:
an error amplifier, configured to compare the output voltage division with the reference voltage to generate the error amplification signal; and
a first comparator, configured to compare the error amplification signal and the ramp signal to generate the initial PWM signal;
wherein the feedback control circuit, the operating signal generator circuit, and the power stage circuit form a feedback circuit for feedback control of the error amplification signal related to the ramp signal.

3. The switching converter having pulse skipping mode of claim 2, wherein the pulse skipping circuit includes:
a duty ratio timing circuit, configured to generate a duty ratio timing signal according to the input voltage and the output voltage;
an integration circuit, configured to perform an integral operation to generate an integral signal during a duration in which the pulse width of the duty ratio timing signal indicates that the inductor current is corresponded to the rising inductor current or the falling inductor current;
a sample-and-hold circuit, configured to sample and hold a peak value of the integral signal to generate the pulse skipping reference signal; and
a second comparator, configured to compare the error amplification signal with the pulse skipping reference signal to generate the pulse skipping signal.

4. The switching converter having pulse skipping mode of claim 3, wherein the power stage circuit includes a buck power stage circuit, wherein the duty ratio timing circuit includes:
a first charging circuit, including a first current source and a first capacitor, wherein the first current source generates a first charging current according to the input voltage, so as to charge the first capacitor to generate a first voltage;
a third comparator, configured to compare the output voltage with the first voltage to generate the duty ratio timing signal, so that the pulse width of the duty ratio timing signal is proportional to a ratio of the output voltage divided by the input voltage; and
a reset switch, coupled to the first charging circuit, configured to reset the first capacitor according to the clock signal, wherein a frequency of the clock signal is the same as a frequency of the adjusted PWM signal during the unmasked period.

5. The switching converter having pulse skipping mode of claim 4, wherein the integration circuit includes a second current source and a second capacitor, wherein the second current source generates a constant current, so as to charge the second capacitor to generate the integral signal during a duration in which the pulse width of the duty ratio timing signal indicates that the inductor current is corresponded to the rising inductor current or the falling inductor current.

6. The switching converter having pulse skipping mode of claim 5, wherein the integration circuit further includes a third current source for generating a differential current related to the input voltage minus the output voltage, so as to further charge the second capacitor to generate the integral signal during a duration in which the pulse width of the duty ratio timing signal indicates that the inductor current is corresponded to the rising inductor current or the falling inductor current.

7. The switching converter having pulse skipping mode of claim 3, wherein the power stage circuit includes an inverse buck-boost power stage circuit, wherein the duty ratio timing circuit includes:
a first charging circuit, including a fourth current source, a fifth current source, and a first capacitor, wherein the fourth current source generates a fourth charging current according to the input voltage, the fifth current source generates a fifth charging current according to the output voltage, and the fourth charging current and the fifth charging current are configured to charge the first capacitor to generate a first voltage;
a third comparator, configured to compare the output voltage with the first voltage to generate the duty ratio timing signal, so that the pulse width of the duty ratio timing signal is proportional to a ratio of the output voltage divided by a sum of the input voltage and the output voltage; and
a reset switch, coupled to the first charging circuit, configured to reset the first capacitor according to the clock signal, wherein a frequency of the clock signal is the same as a frequency of the adjusted PWM signal during the unmasked period.

8. The switching converter having pulse skipping mode of claim 7, wherein the integration circuit includes a second current source and a second capacitor, wherein the second current source generates a constant current, so as to charge the second capacitor to generate the integral signal during a duration in which the pulse width of the duty ratio timing signal indicates that the inductor current is corresponded to the rising inductor current or the falling inductor current.

9. The switching converter having pulse skipping mode of claim 8, wherein the integration circuit further includes a third current source for generating a differential current related to the input voltage minus the output voltage, so as to further charge the second capacitor to generate the integral signal during a duration in which the pulse width of the duty ratio timing signal indicates that the inductor current is corresponded to the rising inductor current or the falling inductor current.

10. The switching converter having pulse skipping mode of claim 3, wherein the power stage circuit includes a boost power stage circuit, wherein the pulse width of the duty ratio timing signal is proportional to one minus a ratio of the input voltage divided by the output voltage.

11. A control method of a switching converter having pulse skipping mode, configured to convert an input power to generate an output power, wherein the control method of the switching converter having pulse skipping mode comprises:
comparing an output voltage division related to an output voltage of the output power with a reference voltage to generate an error amplification signal;
comparing the error amplification signal with a ramp signal to generate an initial PWM signal;
adaptively generating a duty ratio signal according to an input voltage of the input power and the output voltage, so as to generate a pulse skipping reference signal, wherein a level of the pulse skipping reference signal is related to a duty ratio of the adjusted PWM signal which is during an unmasked period;
comparing the error amplification signal with the pulse skipping reference signal to generate a pulse skipping signal;

masking a part of pulses of a clock signal according to the pulse width of the pulse skipping signal to generate a setting signal;

generating an adjusted PWM signal according to the initial PWM signal and the setting signal; and switching at least one power switch of a power stage circuit according to the adjusted PWM signal to convert the input power to generate the output power;

wherein the ramp signal indicates a rising inductor current or a falling inductor current of an inductor current flowing through an inductor of the power stage circuit, wherein the rising inductor current corresponds to a portion of the inductor current keeping rising and the falling inductor current corresponds to another portion of the inductor current keeping falling.

12. The control method of the switching converter having pulse skipping mode of claim 11, wherein the error amplification signal is related to the ramp signal through feedback control.

13. The control method of the switching converter having pulse skipping mode of claim 12, wherein the step of comparing the error amplification signal with the pulse skipping reference signal to generate the pulse skipping signal includes:

generating a duty ratio timing signal according to the input voltage and the output voltage;

performing an integral operation during a duration in which the pulse width of the duty ratio timing signal indicates that the inductor current is corresponded to the rising inductor current or the falling inductor current to generate an integral signal;

sampling-and-holding a peak value of the integral signal to generate the pulse skipping reference signal; and comparing the error amplification signal with the pulse skipping reference signal to generate the pulse skipping signal.

14. The control method of the switching converter having pulse skipping mode of claim 13, wherein the switching converter includes a buck power stage circuit, wherein the step of generating a duty ratio timing signal according to an input voltage of the input power and the output voltage includes:

generating a first charging current according to the input voltage, so as to charge a first capacitor to generate a first voltage;

comparing the output voltage with the first voltage to generate a duty ratio timing signal such that the pulse width of the duty ratio timing signal is proportional to a ratio of the output voltage divided by the input voltage; and resetting the first capacitor according to the clock signal, wherein a frequency of the clock signal is the same as a frequency of the adjusted PWM signal during the unmasked period.

15. The control method of the switching converter having pulse skipping mode of claim 14, wherein the step of performing the integral operation to generate the integral signal includes: charging a second capacitor by a constant current to generate the integral signal during a duration in which the pulse width of the duty ratio timing signal indicates that the inductor current is corresponded to the rising inductor current or the falling inductor current.

16. The control method of the switching converter having pulse skipping mode of claim 15, wherein the step of performing the integral operation to generate the integral signal further includes:

further charging the second capacitor by a differential current related to the input voltage minus the output voltage to generate the integral signal during a duration in which the pulse width of the duty ratio timing signal indicates that the inductor current is corresponded to the rising inductor current or the falling inductor current.

17. The control method of the switching converter having pulse skipping mode of claim 13, wherein the switching converter includes an inverse buck-boost power stage circuit, wherein the step of generating the duty ratio timing signal according to the input voltage of the input power and the output voltage includes:

generating a fourth charging current according to the input voltage and generating a fifth charging current according to the output voltage;

charging the first capacitor to generate a first voltage by the fourth charging current and the fifth charging current;

comparing the output voltage with the first voltage to generate a duty ratio timing signal such that the pulse width of the duty ratio timing signal is proportional to a ratio of the output voltage divided by the sum of the input voltage and the output voltage; and resetting the first capacitor according to a clock signal, wherein a frequency of the clock signal is the same as a frequency of the initial PWM signal.

18. The control method of the switching converter having pulse skipping mode of claim 17, wherein the step of performing the integral operation to generate the integral signal includes: charging a second capacitor by a constant current to generate the integral signal during a duration in which the pulse width of the duty ratio timing signal indicates that the inductor current is corresponded to the rising inductor current or the falling inductor current.

19. The control method of the switching converter having pulse skipping mode of claim 18, wherein the step of performing the integral operation to generate the integral signal further includes: further charging the second capacitor by a differential current related to the input voltage minus the output voltage to generate the integral signal during a duration in which the pulse width of the duty ratio timing signal indicates that the inductor current is corresponded to the rising inductor current or the falling inductor current.

20. The control method of the switching converter having pulse skipping mode of claim 13, wherein the switching converter includes a boost power stage circuit, wherein the pulse width of the duty ratio timing signal is proportional to one minus a ratio of the input voltage divided by the output voltage.

* * * * *